Oct. 5, 1965   G. W. SEIFERT   3,209,993
RAPID-ACTION CLUTCH ASSEMBLY
Filed June 17, 1963   5 Sheets-Sheet 1

GERD W. SEIFERT
Inventor:

AGENT

Oct. 5, 1965  G. W. SEIFERT  3,209,993
RAPID-ACTION CLUTCH ASSEMBLY
Filed June 17, 1963  5 Sheets-Sheet 2
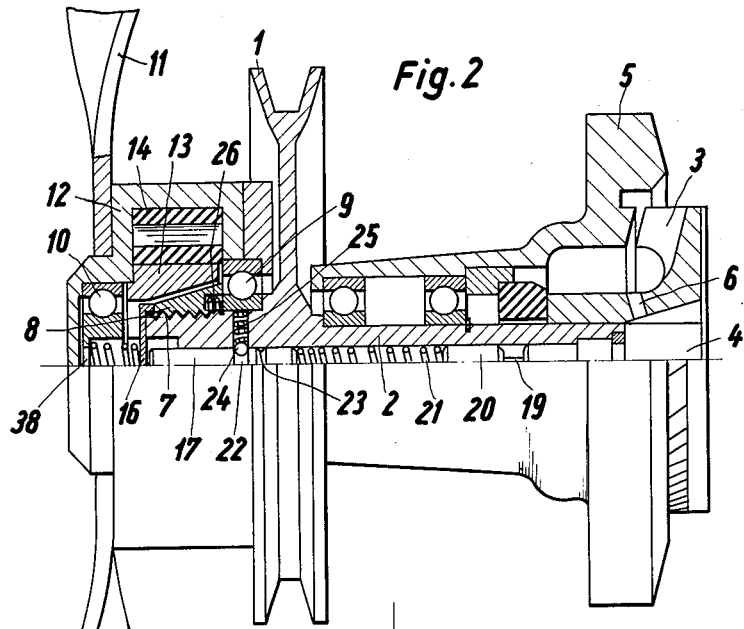
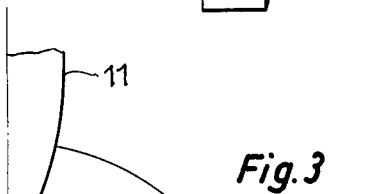
GERD W. SEIFERT
*Inventor:*
Karl F. Ross
AGENT Oct. 5, 1965    G. W. SEIFERT    3,209,993
RAPID-ACTION CLUTCH ASSEMBLY
Filed June 17, 1963    5 Sheets-Sheet 3

GERD W. SEIFERT
*Inventor:*

Karl F. Ross
AGENT

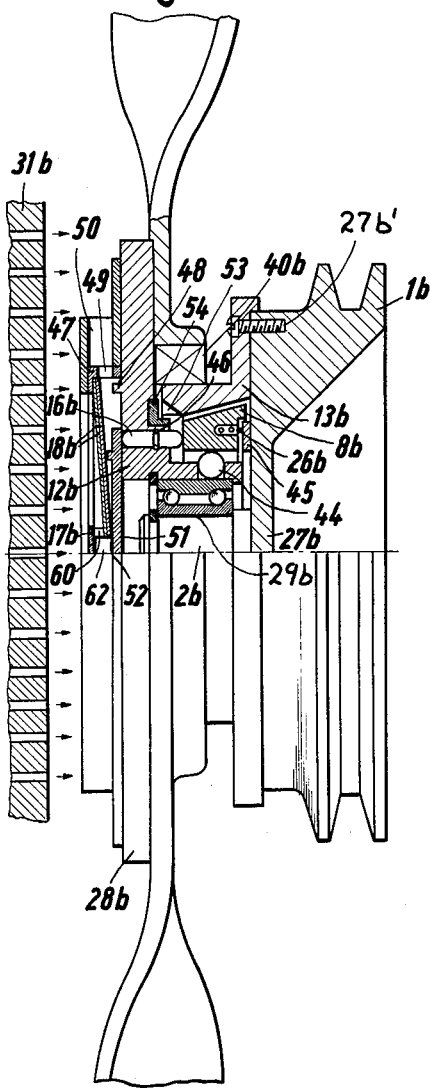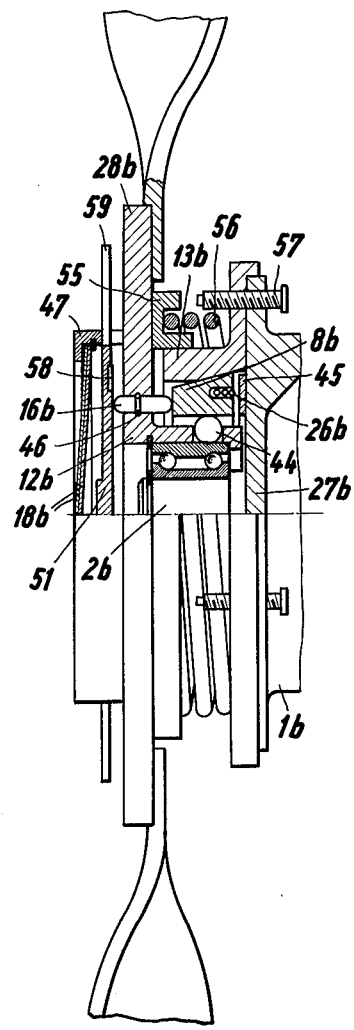

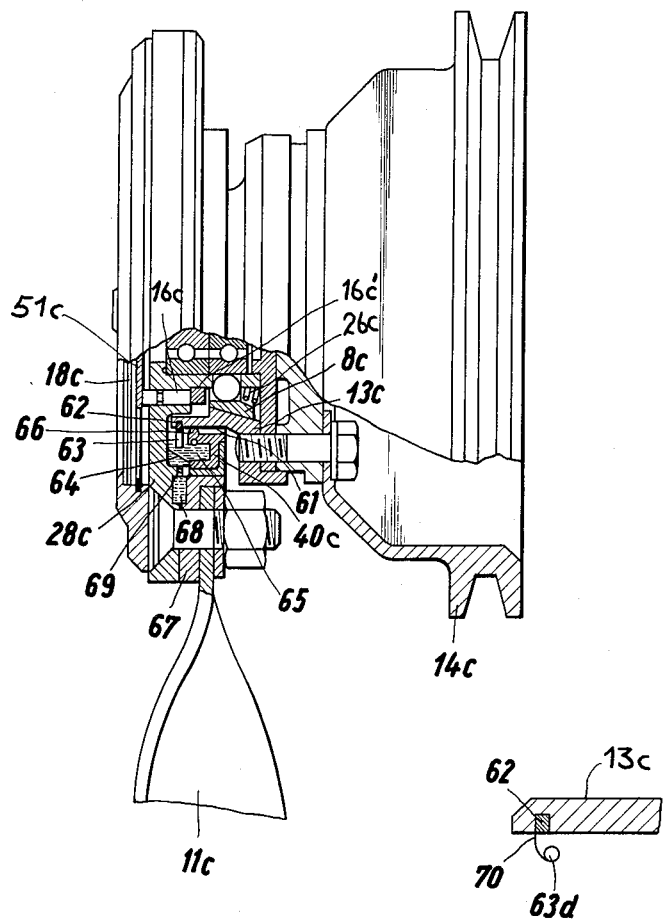

United States Patent Office 3,209,993
Patented Oct. 5, 1965

3,209,993
RAPID-ACTION CLUTCH ASSEMBLY
Gerd W. Seifert, 190 Seestrasse,
Unterschondorf, Germany
Filed June 17, 1963, Ser. No. 288,356
Claims priority, application Germany, June 20, 1962,
S 80,001; Dec. 20, 1962, S 82,993; Apr. 19, 1963,
S 84,769
11 Claims. (Cl. 230—270)

The present invention relates to clutch assemblies and, more particularly, to improvements in clutch assemblies suitable for use in the cooling systems of, for example, automotive vehicles.

It is know to provide automotive cooling systems, having a radiator through which a cooling liquid is circulated by a pump coupled with the engine and a rotor driven thereby for displacing air through this radiator, with temperature-controlled clutch means interposed between the rotor and the engine for disengaging the rotor when the temperature of the liquid passing through the radiator is below a predetermined value and operatively connecting this rotor with the engine upon a rise in this temperature. Principally, these clutches are of the normally opened or normally closed type. When the former is employed, a gradual rise in temperature frequently causes only limited engagement of the clutch members, whereas normally closed clutches have their members spread apart only limitedly during the gradual temperature rise. In either case, the clutch surfaces frictionally interengage while being relatively displaced so as to cause substantial wear of these surfaces as a consequence of relative movement under frictional contact and necessitate the replacement and refinishing at frequent intervals.

In fact, this disadvantage of clutches of the known type has prevented their widespread use although, in general, it may be said that more effective and efficient cooling can be obtained by the use of a clutch interposed between the rotor and the source of motive power than in the absence of such a clutch.

It is, therefore, the principal object of the present invention to provide a clutch, particularly suitable for the aforedescribed purpose, wherein the substantial wear characterizing earlier devices can be obviated and which has a relatively long life and yet is of simple construction so as to be relatively inexpensive to install and operate.

Another object of the invention is to provide an improved rapid-action clutch assembly which is responsive to variations in thermal conditions and has a relatively long operating life.

These objects and others which will become apparent hereinafter are attained, in accordance with the present invention, by providing a clutch assembly which comprises a pair of relatively rotatable members connectable, respectively, to a source of motive power and a load, the latter being a blower rotor when the clutch assembly is employed in the cooling system of an automotive vehicle. These members, which are journaled for rotation about a common axis, are provided with respective clutch elements having juxtaposed annular clutch surfaces surrounding the axis. One of these elements is displaceable with an axial component toward and away from the other between a first position wherein the clutch surfaces are in frictional engagement and the second position wherein the surfaces are spaced apart totally out of engagement. The movable clutch element cooperates with actuating means for displacing it and, preferably, bistable temperature-responsive means adapted to cooperate with the actuating means for precipitously triggering the latter to displace the movable element substantially instantaneously between these positions. It will be apparent that the major disadvantages of earlier devices can indeed be obviated by such a structure since the use of a bistable temperature-responsive means insures that gradual engagement and disengagement of the clutch surfaces will not take place. In fact, this arrangement insures total elimination of the gradual pressure rise acting upon the movable clutch element and heretofore employed for engaging and disengaging a clutch.

According to one aspect of the present invention, the actuating means, which advantageously includes one or more members bearing upon the movable clutch element outwardly from the axis, cooperates with a displacing member having two stable positions as defined by detent or retaining means cooperating therewith while a force-storage means acts upon this displacing member to release it from this locking means, the force-storage means cooperating with a temperature-sensitive device which gradually increases the pressure applied to the displacing member until such pressure is sufficient to overcome the retaining force of the detent means and permit shifting of the displacing member from one operative position into the other. This actuating means can be a rod extending through a hollow shaft which carries one of the members of the clutch assembly, the force-storing means including a spring likewise disposed within this shaft. A particularly advantageous construction of the device includes pump means mounted directly upon this shaft for displacing the cooling liquid through the radiator, the temperature-sensitive device being disposed in contact with the circulating liquid. Thus it is possible to mount the impeller of the pump means directly upon this shaft and to dispose the temperature-sensitive device thereon with passages communicating with the temperature-sensitive device and the pump chamber for feeding the circulated liquid to the temperature-sensitive device. While the movable clutch element may be simply keyed to its respective clutch member for mutual entrainment, the clutch element being axially displaceable, it is preferred to interconnect the element with this member via a thread formation having a relatively coarse pitch (via a so-called "steep thread") so that some degree of relative rotation occurs to force the movable clutch element into engagement with the juxtaposed axially fixed element, this thread being effective to accelerate the displacement of the movable clutch element into its engaged position upon incipient rotary entrainment of one clutch member by the other.

The bistable temperature-responsive means can, according to another aspect of the present invention, include a thermally sensitive device adapted to snap between two stable positions in the manner of a toggle joint or the like. As previously mentioned, the precipitously operating actuating means can be provided with detent means for holding it in position temporarily against displacement until a predetermined force, corresponding to the switching temperature, is developed. It should be understood that it is also possible to provide a rotary device of this type or to provide a toggle-lever mechanism totally independent of a force-storage means, this toggle having two stable positions on opposite sides of a so-called deadcenter position. Thus it is contemplated, according to the invention, to provide a bistable membrane which is bowed in one direction but, upon application of axial force, will snap into a position in which it is oppositely concave. To this end, the "toggle" can be formed by a curved resilient membrane which will not plastically deform under applied pressure and can snap between stable positions substantially instantaneously. According to a more particular feature of the invention, the resilient membrane may be a dished disk itself constituting a thermally sensitive element, e.g. a bimetallic disk capable of changing between positions of opposite concavity upon temperature increases or decreases past well-defined reversal points (a property referred to as "bistable"). When this system is employed in an automotive vehicle, the temperature-responsive means can be sensitive to the temperature of the cooling liquid circulated by the pump and/or to the temperature of the air which is displaced by the rotor or which traverses the radiator upon movement of the vehicle. In either case, the temperature-sensitive device should be exposed to the particular fluid by means of which clutch control is to be carried out. It will be apparent, however, that the temperature-sensitive device can also be positioned to respond to the thermal conditions of other portions of the system, namely the engine block, the oil pan, or the like.

According to a further feature of this invention, the driven member of the clutch assembly is not rigidly secured to the rotor but is connectable therewith via a friction clutch whose gripping force is increased upon rotation of the driven member. The friction clutch can, if desired, be engaged or disengaged via centrifugally operable means independent of the temperature-responsive means previously described although it is preferred to maintain this frictional clutch permanently engaged and to use the centrifugally operable means only to tighten the connection. This construction is particularly advantageous in that the clutch elements controlled by the temperature-responsive means are not exposed to deterioration as a consequence of the inertia of the blower rotor.

The basic construction of the clutch assembly described heretofore permits the use of other advantageous expedients which facilitate operation of the clutch and limit its wear. For one thing, it is possible, according to this invention, to provide the drive and driven members of the clutch assembly with a pair of juxtaposed annular faces which are almost in contacting relationship and to form a lubricant film therebetween, thereby limiting wear and providing an effective lubricant seal between the two clutch members. To this end, these annular faces are provided adjacent an annular trough-shaped portion of one of the members which contains the lubricant, the other member being provided with distributing means, advantageously in the form of a plurality of resilent fingers projected into the trough, for picking up the lubricant and casting it between the juxtaposed faces. It is also advantageous to provide between the relatively rotating member one or more elastic annular sealing elements outwardly of the movable and relatively stationary clutch surfaces to prevent entry of foreign matter therebetween.

The above and other objects, features and advantages of the present invention will become more readily apparent from the following description, reference being made to the accompanying drawing in which:

FIG. 2 is a view similar to FIG. 1 showing the clutch elements in their disengaged condition;

FIG. 3 is a front-elevational view of the assembly of FIGS. 1 and 2;

FIG. 6 is a side elevational view, partly in axial cross-section, of a third embodiment of the invention with the clutch elements thereof disengaged;

FIG. 7 is a view similar to FIG. 6 of a clutch assembly generally similar thereto but modified in certain respects, the clutch elements being shown in their engaged condition;

FIG. 8 is a fragmentary elevational view of a clutch assembly showing improved lubricating means according to this invention; and FIG. 9 is a detail view of the device of FIG. 8 drawn to an enlarged scale.

Figure 1:
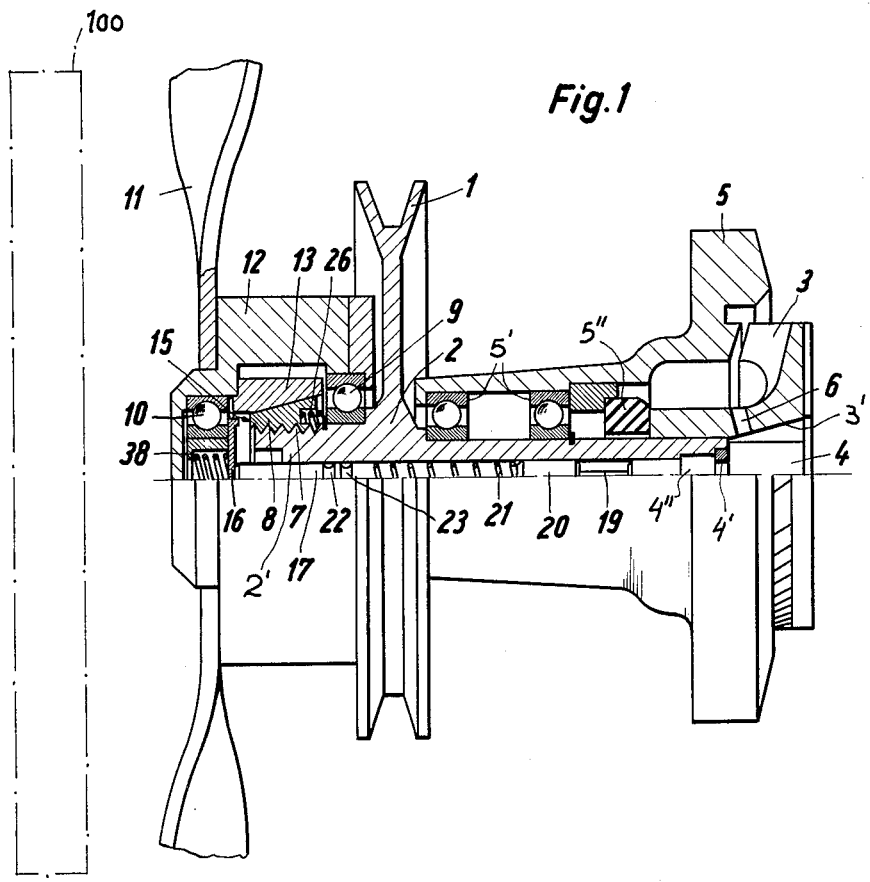
FIG. 1 is a side-elevational view partly in axial cross-section, illustrating a first clutch assembly according to the present invention with the clutch elements thereof in their engaged condition.

In FIGS. 1–3, I show a V-belt drive pulley 1 which can be connected via the usual V-belt to the crankshaft pulley of a conventional internal-combustion engine not illustrated in detail herein. Pulley 1 is integral with a drive shaft 2 which carries the impeller 3 of the water-circulating pump 5 of the cooling system of the engine. The drive shaft 2 is journaled in this pump housing via a pair of axially spaced bearings 5', the usual seal 5" also being provided to prevent the escape of coolant. Impeller 3 is formed with a central recess 3' in which is lodged a temperature-sensitive device 4 to which the cooling fluid is admitted via radial bores 6. This temperature-sensitive device can be a thermostat which is held in place within shaft 2 by a snap ring 4', the thermostat having an axially extensible stud 19 adapted to control the clutch. At the forward end 2' of shaft 2, a movable frusto-conical clutch element 8 is mounted by means of a coarse-pitch thread 7 whereby a slight relative rotation of clutch element 8 and shaft 2 suffices to urge this element against a juxtaposed clutch element 13. The forward end 2' of shaft 2 also carries a pair of axially spaced bearings 9, 10 upon which the blower rotor, i.e. fan blade 11, is journaled via its hub 12. This hollow hub carries the annular clutch element 13 via resilient sleeves 14 angularly spaced around clutch element 13; hub 12 thus constitutes the driven member of the clutch assembly. Shaft portion 2' is formed with a transverse cutout 15 in which the pressure plate 16 of the clutch-actuating means is axially displaceable and adapted to abut against clutch element 8 outwardly of the axis of the assembly. Shaft portion 2' also receives a compression spring 38 which urges this pressure plate 16 against clutch element 8 counter to the force of a displacing member or rod 17 adapted to bear on plate 16 in a direction opposite the force of spring 38.

The extensible stud 19 of thermostat 4 acts upon a stub shaft 20, axially displaceable within the interior of hollow drive shaft 2, and thus serves to compress a coil spring 21 disposed between stud 20 and rod 17. Spring 21 thus constitutes force-storage means adapted to act upon this rod. The latter is formed with a pair of circumferential recesses 22, 23 axially spaced apart and adapted to cooperate with a detent 24 urged radially inwardly by a spring 25 (FIG. 2). Detent 24, 25 thus serves as a locking means adapted to hold rod 17 in either of two positions defined, respectively, by grooves 22 and 23. Each of these stable positions corresponds to a stable position of clutch elements 8, 13. When the assembly is in the position shown in FIG. 1, detent 24 is received within recess 23 so that a compression spring 26 can force clutch element 8 into engagement with element 13. When rod 17 is, however, in its position shown in FIG. 2, detent 24 engages in recess 22 whereupon compression spring 38, which has a force greater than that of spring 26, urges plate 16 against element 8 and thus withdraws it from engagement with element 13. The temperature-sensitive device 4 advantageously is joined to the shaft 2 via a body 4" of a material having a low coefficient of thermal conductivity.

The system of FIGS. 1–3 operates as follows: Under normal conditions, with the temperature in the cooling system below a predetermined value, pulley 1 is driven by a V-belt from the crankshaft of the engine and rotates pump impeller 3 to circulate the coolant between the engine and the automotive radiator 100 (dot-dash lines) disposed forwardly of the fan-blade rotor 11. Since clutch elements 8 and 13 are in the disengaged position shown in FIG. 2, rotor 11 turns freely about its axis but is not rotated positively by drive shaft 2.

Upon a rise in the temperature of the coolant as, for example, a consequence of intermittent operation of the vehicle, the stud 19 of thermostat 4 extends axially and urges the stud 20 to the left (FIG. 1) to compress spring 23 until this force-storing means has a compressive force in excess of that of spring 38 in combination with the retaining force of detent 24. Displacing member 17 is then released from the detent and withdraws the actuating plate 16 from contact with clutch element 8, whereupon a slight relative rotation between this element and its shaft 2 suffices, under the action of spring 26, rapidly to drive this clutch element against the axially fixed element 13, both these elements having juxtaposed axially converging clutch surfaces as previously described. The rotary movement of shaft 2 is thus transmitted to clutch element 13 and thence to the rotor hub 12 via the resilient sleeves 14 so that rotor 11 is driven to induce air through radiator 100 and reduce the temperature of the coolant; resilient members 14 cushion the shock to rotor 12 upon the impulsive engagement of the clutch elements. Detent 24 then enters recess 22 to ensure the maintenance of clutch engagement in spite of a tendency for the temperature sensed by thermostat 4 to drop with consequent retraction of its stud 19.

When the temperature of the coolant falls sufficiently, stud 19 withdraws to decompress spring 21 to a point at which the restoring force of spring 38 exceeds the pressure of spring 26 in combination with the retaining force of detent 24, whereupon member 17 is shifted to the right to bring the actuating plate 16 again into abutment with clutch element 8 and urge it out of engagement with element 13. Detent 24 then drops into recess 22 to hold the clutch in its disengaged position.

Figure 4:
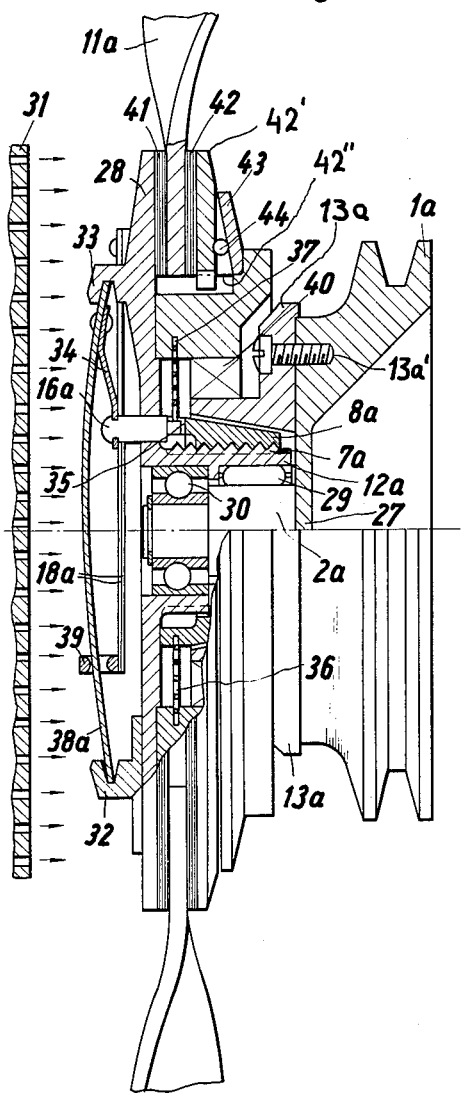
FIG. 4 is a view similar to FIG. 1 showing another clutch assembly with its elements in their disengaged condition.
Figure 5:
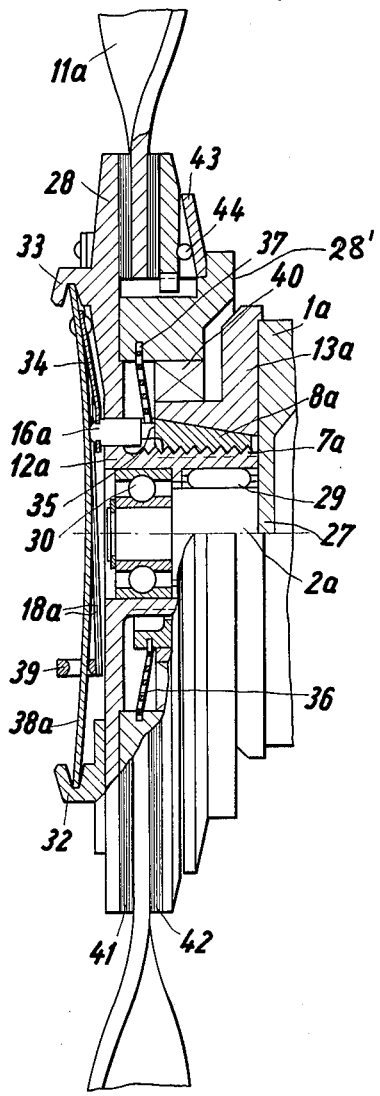
FIG. 5 is a side-elevational view partly in axial cross-section, illustrating the device of FIG. 4 in its engaged condition.

In FIGS. 4 and 5, I show another clutch assembly wherein the temperature-sensitive device, unlike that of the embodiment of FIGS. 1 and 2 which lies in the path of the cooling liquid, is disposed in the stream of air passing through the radiator shown schematically at 31. In this case, the V-belt pulley 1a is provided with a transverse flange 27 upon which a shaft 2a is mounted. This flange also carries the outer and axially fixed clutch member 13a which is secured thereto via bolts 13a' only one of which is shown in FIG. 4. Shaft 2a is provided with a needle bearing 29 and a ball bearing 30, axially spaced therefrom, upon which the hub 12a of the driven member 28 of the assembly is journaled. A pair of opposing formations 32, 33, provided with inwardly open recesses, receive a curved membrane-type spring 38a adapted to snap between two stable positions (FIGS. 4 and 5) without substantial plastic deformation. Spring 38a carriese, via a short leaf spring 34, an actuating pin or pusher 16a axially slidable in member 28 and adapted to bear against the movable clutch element 8a which is mounted upon hub 12a for sliding displacement toward and away from the juxtaposed element 13a. To this end, pin 16a has an abutting surface 35 confronting the movable element 8a which is mounted upon the hub 12a via a "steep" thread 7a as previously described; it should be noted, however, that hub 12a can also be designed as a splined shaft with element 8a keyed thereto. Element 8a cooperates with a flexible link in the form of a spring 36 which is coiled spirally around the axis of the assembly and has its inner end joined to clutch element 8a while its outer end is secured at 37 to an annular body 28' constituting part of driven member 28, thereby limiting the relative rotation of element 8a and member 28. Upon the latter, rearwardly of snap spring 38a, there is mounted a bimetallic temperature-sensitive device 18a having a hook-shaped extremity 39 forming a lost-motion two-way connection with spring 38a. Any conventional adjusting device (e.g. a setting screw) can be used to establish the temperature at which bimetallic element 18a trips spring 38a. A sealing ring 40, which can be of a resilient type but preferably forms an oil seal, is positioned between clutch members 13a and 28 outwardly of the clutch surfaces for preventing the entry of foreign matter therebetween. The blades 11a of the rotor are mounted upon driven member 28 between peripheral friction-clutch surfaces 41, 42 whose clamping action is reinforced by centrifugal action. While friction surface 41 can be composed of the usual brake- or clutch-lining material and is disposed directly upon member 28, the other somewhat resilient lining 42 is formed upon an annular plate 42' keyed to member 28 for rotation therewith by a plurality of angularly spaced splines 42" which pass through suitable notches in plate 42'. A frusto-conical spring ring 43 holds disk 42' against blades 11a via a plurality of balls 44 which are urged outwardly by centrifugal force to tighten the clamping engagement of blades 11a in step with the increased tendency for them to be thrown outwardly.

In FIG. 4 the assembly is shown in its disengaged state and remains so as long as the flow of air passing through radiator 31, as a consequence of the forward motion of the vehicle, maintains a normal temperature. Upon increase of the air temperature above the normal value (indicative of a rise in the temperature within the engine) sensing element 18a deforms to draw spring 38a axially inwardly whereupon it springs into the position shown in FIG. 5 and displaces pin 16a against clutch element 8a to urge it into contact with element 13a; this occurs at an instant when the resilient membrane 38a passes through an unstable intermediate position between the two illustrated stable positions. Member 28 is then rotated together with blades 11a through the intermediary of spring 36 which flexes upon axial displacement of clutch element 8a and is tightened as the latter rotates relatively to hub 12a in proceeding into engagement with member 13a. upon cooling of the fluid circulated through the radiator via the forced draft of blades 11a, bimetallic element 18a displaces spring 38a again into its outwardly convex position shown in FIG. 4 whereupon pin 16a is withdrawn from engagement with clutch element 8a and the latter shifts to the left as a consequence of the slowdown of member 28.

In FIGS. 6 and 7 I show another device wherein the drive pulley 1b is rotated with the water pump and carries a flange 27b integral therewith. The axially stationary clutch element 13b is bolted to this flange 27b at 27b', a shaft 2b extending axially from this flange. The hub 12b of rotor 28b is journaled on shaft 2b via bearing 29b and is provided with a keying ball 44 which projects into a coarse-pitch thread groove of the axially displaceable movable clutch element 8b against which a restoring spring 26b bears. A disk 45 is interposed between spring 26b and flange 27b to prevent deterioration of the spring upon relative rotation of the clutch members. This disk is axially displaceable upon hub 12b keyed thereto to prevent relative rotation. Rotor 28b carries a plurality of angularly spaced actuating pins 16b which bear upon clutch element 8b and are each surrounded by a sealing ring 46 which also serves, to some extent, as a restoring device by virtue of the elastically deformable character of such rings. In this case, the temperature-sensitive device is also positioned in the air stream from radiator 31b and includes a bimetallic snap spring 18b of preferably, frusto-conical configuration (see FIG. 6). This spring is adapted to alternate between stable positions shown in FIGS. 6 and 7 upon temperature rise or temperature fall past predetermined values.

As can best be seen in FIG. 6, the dished spring 18b is mounted in a ring 47, of L-shaped cross-section, made of a thermally insulating material and provided with radial passages 49 for the centrifugal sloughing off of foreign matter from the actuating mechanism. Passages 49 communicate with channels 50 of rotor 28b to form a fluid connection between the exterior and the rear side of sensing spring 18b. The latter bears upon an actuating plate 51 which is provided with spring formations 52 by means of which the throw of this plate relative to spring 18b can be adjusted, if desirable. Along the front surface of spring 18b, a flange 17b of a central stud 62 of plate 51 carries resilient formations 60. The formations 52 and 60 facilitate rapid reversal of spring 18b. Projections 54 on rotor member 28b form abutments for the rim of spring 18b in its reversed position.

The operation of the devices of FIGS. 6 and 7 does not differ substantially from those described hereinbefore so that no particular mention of the steps need be made at this point. It should, however, be noted that in the device of FIG. 6 a sealing ring 40b is interposed between members 13b and 28b while the assembly is provided with lubricating means for facilitating the operation of the device as a slip clutch. To this end, member 28b carries a flange 54 juxtaposed with projections 53 of member 13b which together entrain a ring of a lubricant such as oil contained within the clutch chamber formed by seal 40b. This oil ring forms a further seal for the interior clutch surfaces. The seal shown in FIG. 7 differs somewhat from that of FIG. 6 and, advantageously, comprises a slide ring 55 axially displaceable upon member 13b and urged into frictional engagement with member 28b via a coil spring 56. An adjustable abutment 57 is provided for limiting axial movement of ring 55. In the structures of both FIGS. 6 and 7, a manually displaceable handle 59 can be provided for plate 51 so that the latter can operate the clutch independently of the temperature-sensitive device.

The embodiment of FIG. 8 is a clutch, generally similar to that shown in FIGS. 4–7, wherein the bimetallic spring 18c acts upon a plate 51c of the rotor 28c to displace pins 16c against a ring 16c' which acts upon clutch element 8c against the force of a restoring spring 26c. The oil seal in the present embodiment is formed between the outer surface 61 of the axially stationary clutch element 13c and a sealing lip 66 of a sealing ring 40c carried by member 28c. This arrangement can be used in place of the seals 40 and 40b previously described. The outer surface of member 13c carries a ring 62 provided with a plurality of radially projecting fingers 63 angularly spaced about this ring. These fingers are juxtaposed with projections 64 within an oil trough 65 formed by ring 40c in member 28c. When the drive and driven members 14c and 28c rotate jointly, the lubricant within the trough forms a substantially continuous ring. Upon opening of the clutch, however, the speed of the blades 11c is reduced by air friction so that a relative displacement between members 14c and 28c develops. Oil is thus picked up by the fingers 63 and, by the agitation derived from the two sets of formations 63, 64 is distributed between the sealing lip 66 and the surface 61 to prevent any frictional deterioration of these formations as a consequence of their relative motion. The fingers of at least one set may be resilient so that the oil is catapulted upon their engagement with the other formations. Member 28c is formed with oil-storage reservoirs 68 between itself and a plate 67 secured thereto, these reservoirs communicating with trough 65 via a passage 69 for insuring that a minimum quantity of oil will always be retained in the trough. The trough 65 is formed with an undercut portion below lip 66 to provide a reservoir for the lubricant and insure that the oil ring produced upon rotation of the assembly will communicate with all of the reservoirs 68; when the driven member 28c slows down or is stationary, the lubricant from the upper reservoir will, of course, flow into the lower portion of the trough to ensure proper entrainment by the fingers and formation of the seal.

In FIG. 9 I show a particularly satisfactory configuration of the fingers projecting into the trough. The fingers are loops 63d of a resilient wire 70 integral with the carrying ring 62 which is preferably formed of a synthetic resin which is both resistant to the lubricant and elastically deformable. This ring 62 can be seated in a suitable recess in member 13c as shown in FIG. 9.

The invention described and illustrated is believed to admit of many modifications within the ability of persons skilled in the art, all such modifications being considered within the spirit and scope of the appended claims.

I claim:

1. A rapid-action clutch assembly comprising a first member rotatable about an axis and connected to a source of motive power; a second member journaled for rotation relative to said first member coaxially therewith and connected to a load; a first clutch element fixedly mounted upon said first member and provided with an annular contact surface surrounding said axis; a second clutch element mounted upon said second member with freedom of axial and rotary displacement relative thereto and provided with an annular contact surface confronting the contact surface of said first element; mechanism for axially shifting said second element between a first position wherein said surfaces are in frictional interengagement and a second position wherein said surfaces are spaced apart, said mechanism including resilient means urging said second element into one of said positions and temperature-responsive means thermally deformable in the direction of said axis for counteracting said resilient means and shifting said second element into the other of said positions in response to a predetermined change in ambient temperature; flexible link means independent of said temperature-responsive means interconnecting said second member and said second element for limiting their relative rotation; and a coarse-thread coupling between said second member and said second element for accelerating a movement of the latter into said first position upon incipient rotary entrainment of said second element by said first element.

2. A rapid-clutch assembly for a radiator fan on an automotive engine facing a radiator traversed by a cooling liquid, comprising a driving member rotatable about an axis and coupled with said engine; a driven member journaled for rotation relative to said driving member coaxially therewith and coupled with said fan; a first clutch element fixedly mounted upon said driving member and provided with an annular contact surface surrounding said axis; and axially movable second clutch element mounted upon said driven member with freedom of limited rotation relative thereto and provided with an annular contact surface confronting the contact surface of said first element; mechanism for axially shifting said second element between a first position wherein said surfaces are in frictional interengagement and a second position wherein said surfaces are spaced apart, said mechanism including resilient means urging said second element into one of said positions and temperature-responsive means thermally deformable in the direction of said axis for counteracting said resilient means and shifting said second element into the other of said positions in response to a predetermined change in the temperature of an ambient air stream from said radiator; and a coarse-thread coupling between said driven member and said second element for accelerating a movement of the latter into said first position upon incipient rotary entrainment of said second element by said first element.

3. An assembly as defined in claim 2 wherein said first and second members are provided with a pair of closely juxtaposed annular sealing faces, further comprising means for introducing a layer of a lubricant between said faces.

4. An assembly as defined in claim 3 wherein said means for introducing a lubricant between said faces includes a lubricant-retaining trough provided in one of said members and distributing means on the other of said members extending into said trough or displacing the lubricant contained therein between said faces.

5. An assembly as defined in claim 4 wherein said distributing means includes a plurality in angularly spaced resilient fingers dipping into said trough.

6. An assembly as defined in claim 5 further comprising at least one storage chamber formed in said one of said members and communicating with said trough for feeding additional lubricant thereto.

7. A rapid-action clutch assembly for a radiator fan on an automotive engine facing a radiator traversed by a cooling liquid, comprising a driving member rotatable about an axis and coupled with said engine; a driven member journaled for rotation relative to said driving member coaxially therewith and coupled with said fan;

a first clutch element fixedly mounted upon said driving member and provided with an annular contact surface surrounding said axis; a second clutch element mounted upon said driven member with freedom of axial and rotary displacement relative thereto and provided with an annular contact surface confronting the contact surface of said first element; mechanism for axially shifting said second element between a first position wherein said surfaces are in frictional interengagement and a second position wherein said surfaces are spaced apart, said mechanism including resilient means urging said second element into one of said positions and temperature-responsive means thermally deformable in the direction of said axis for counteracting said resilient means and shifting said second element into the other of said positions in response to a predetermined change in the temperature of an ambient air stream from said radiator; flexible link means independent of said temperature-responsive means interconnecting said driven member and said second element for limiting their relative rotation; and a coarse-thread coupling between said driven member and said second element for accelerating a movement of the latter into said first position upon incipient rotary entrainment of said second element by said first element.

8. A rapid-action clutch assembly for a radiator fan on an automotive engine facing a radiator traversed by a cooling liquid, comprising a driving member rotatable about an axis and coupled with said engine; a driven member rotatable coaxially with said driving member and coupled with said fan; clutch means interposed between said members; a temperature-sensitive bimetallic element mounted upon said driven member and exposed to an ambient air stream from said radiator; a curved resilient membrane mounted upon said driven member adjacent said bimetallic element, said membrane having two stable positions of opposite curvature; means forming a two-way lost-motion connection between said membrane and said element for translating thermal deformations of said element into reversals of curvature of said membrane upon changes in the temperature of said air stream beyond predetermined upper and lower limits; and actuating means for said clutch means responsive to displacement of said membrane into one of said positions upon a rise in said temperature above said upper limit whereby said fan is set in motion.

9. A rapid-action clutch assembly for a radiator fan on an automotive engine facing a radiator traversed by a cooling liquid, comprising a first member rotatable about an axis and coupled with said engine; a second member rotatable coaxially with said first member and coupled with said fan; a first clutch element fixedly mounted upon said first member and provided with an annular contact surface surrounding said axis; an axially movable second clutch element mounted upon said second member and provided with an annular contact surface confronting the contact surface of said first element; and a thermosensitive clutch-actuating mechanism on said second member exposed to an ambient air stream from said radiator for axially shifting said second element into frictional engagement with said first element upon said temperature exceeding a predetermined upper limit and for removing said second element from such frictional engagement upon said temperature dropping below a predetermined lower limit, said mechanism including a curved resilient membrane having two stable positions of opposite curvature and bimetallic means coupled with said membrane via a two-way lost-motion connection, said assembly further including pusher means movably interposed between said second element and said membrane for establishing pressure-transmitting contact therebetween in a position of said membrane intermediate said stable positions.

10. An assembly as defined in claim 9 wherein said second member is provided with peripheral clamping means and said fan comprises a set of radial blades frictionally mounted on said second member, said clamping means including centrifugal means for increasing the mounting friction of said blades upon rotation of said second member.

11. A rapid-action clutch assembly for a radiator fan on an automotive engine facing a radiator traversed by a cooling liquid, comprising a first member rotatable about an axis and coupled with said engine; a second member rotatable coaxially with said first member and coupled with said fan; a first clutch element fixedly mounted upon said first member and provided with an annular contact surface surrounding said axis; an axially movable second clutch element mounted upon said second member and provided with an annular contact surface confronting the contact surface of said first element; and a thermosensitive clutch-actuating mechanism on said second member exposed to an ambient air stream from said radiator for axially shifting said second element into frictional engagement with said first element upon said temperature exceeding a predetermined upper limit and for removing said second element from such frictional engagement upon said temperature dropping below a predetermined lower limit, said mechanism including a curved resilient membrane having two stable positions of opposite curvature, said assembly further including pusher means movably interposed between said second element and said membrane for establishing pressure-transmitting contact therebetween in a position of said membrane intermediate said stable positions, said second member being provided with peripheral clamping means and said fan comprising a set of radial blades frictionally mounted on said second member, said clamping mean including centrifugal means for increasing the mounting friction of said blades upon rotation of said second member.

References Cited by the Examiner

UNITED STATES PATENTS

| 1,235,940 | 8/17 | Shipman | 192—54 X |
| 1,410,361 | 3/22 | Blackmore | 123—41.12 |
| 2,086,954 | 1/34 | Fawick | 192—54 X |
| 2,381,567 | 8/45 | Bonham | 192 |
| 2,438,161 | 3/48 | Greenlee | 192 |
| 2,516,269 | 7/50 | Starkey | 192 |
| 2,570,515 | 10/51 | Bonham | 192 |
| 2,675,899 | 3/54 | Bonham | 192 |
| 2,877,751 | 3/59 | Johnston | 192 |
| 2,950,796 | 8/60 | Becker | 192 |
| 3,075,691 | 1/60 | Kelly | 192 |

DON A. WAITE, *Primary Examiner.*

DAVID J. WILLIAMOWSKY, *Examiner.*